United States Patent [19]
Rodgers et al.

[11] Patent Number: 6,064,940
[45] Date of Patent: *May 16, 2000

[54] PLOTTER FOR CONSTRUCTION SITES AND METHOD

[75] Inventors: Edwin B. Rodgers, Hilton Head Island; William T. Thornley, Bluffton, both of S.C.

[73] Assignee: The Appalos Corporation, Hilton Head, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/648,429

[22] Filed: May 15, 1996

[51] Int. Cl.[7] .......................... G01N 21/86; G06F 165/00
[52] U.S. Cl. .................... 701/207; 701/25; 701/300; 342/450
[58] Field of Search .................. 701/23, 24, 25, 701/26, 201, 205, 207, 208, 217, 223, 300, 302; 342/357, 450, 451, 457; 324/323, 329; 340/990, 903, 943

[56] References Cited

U.S. PATENT DOCUMENTS

| | | | |
|---|---|---|---|
| 4,796,198 | 1/1989 | Boultinghouse et al. | 701/23 |
| 4,924,450 | 5/1990 | Brashear et al. | 324/329 |
| 5,204,814 | 4/1993 | Noonan et al. | 701/25 |
| 5,349,520 | 9/1994 | Hickman | 342/118 |
| 5,367,458 | 11/1994 | Roberts et al. | 701/25 |
| 5,453,931 | 9/1995 | Watts, Jr. | 701/23 |
| 5,493,494 | 2/1996 | Henderson | 342/357 |
| 5,549,412 | 8/1996 | Malone | 404/84.1 |

*Primary Examiner*—Tan Nguyen
*Attorney, Agent, or Firm*—Ralph Bailey P.A.

[57] ABSTRACT

A plotter and method for laying out computerized construction plans on a construction site includes a mobile applicator (A) carrying a locator (B) for supplying location data to a central processing unit (C) which stores the construction plans, and provides an output signal to an actuator (D) for initiating marking of the site by the applicator. An operator manually traverses the mobile applicator over a path calculated to cover the entire construction site, and the actuator causes the applicator to progressively mark the site responsive to signals from the central processing unit, so that the marks on the site correspond with the construction plans.

5 Claims, 4 Drawing Sheets

6,064,940

PLOTTER FOR CONSTRUCTION SITES AND METHOD

BACKGROUND OF THE INVENTION

This invention relates to an apparatus and method for laying out construction plans onto a construction site.

Building contractors generally employ a survey team to establish the exact location of the building "footprint" on a construction site. Masonry contractors must utilize a layout team to measure the locations for all walls where concrete block foundations are required. Similarly, for example, framers must utilize a layout team to measure the locations for all walls to be constructed on a concrete slab or wood floor. These processes can be very expensive and time consuming. It is necessary to have these plans laid out on the site in advance so that the building crews may properly coordinate the building project. Heretofore, for example, a building contractor had to hire survey and layout teams to progressively survey and mark the ground or floor plans onto each floor of a building under construction. This procedure requires that the survey and layout teams finish marking each floor or level successively before other workers may begin work on any given level, creating frequent waiting periods for the other workers. Also, layout teams often mark the construction plans on the construction site using chalk, resulting in problems during inclement weather. If the chalk lines wash away, the layout teams must go through the same procedure again, slowing progress and further increasing costs. Although layout teams include skilled workers, human error may occur during the marking of the construction plans on the site, causing more problems, delays, and increased costs.

Attempts have been made to assist survey and layout crews in marking construction plans on construction sites. U.S. Pat. No. 4,836,669 discloses an apparatus and method for projecting laser light in orthogonal planes to lay out a reference grid. However, the above problems persist because a survey or layout crew is still required, and no method or apparatus for laying out the actual construction plans on the construction site is contemplated.

It is, therefore, desirable to provide an apparatus and method for quickly, easily, and accurately marking construction plans directly on a construction site, either onto the ground or onto a floor. It would be advantageous to reduce time spent on surveying, measuring and laying out the construction plans, and to eliminate mistakes, thus reducing construction costs. Practice of the invention would obviate the need for professional surveying and layout crews, allowing construction plans to be applied accurately and quickly to a construction site by a single, unskilled worker.

SUMMARY OF THE INVENTION

Accordingly, an important object of the invention is to provide a plotter including a mobile applicator and method wherein layout time is minimized, and wherein accuracy is limited only by computer software and architectural plans, and is not limited by the skills of an operator, and wherein the apparatus and method may be employed effectively by a single unskilled operator with minimal training.

An important additional object of the present invention is to provide a mobile marker having an applicator for marking construction layout plans onto a construction site using data produced by a current position locating system that is capable of continuously determining the location of the mobile marker in relation to established points on the construction site.

Another important object of the invention is to provide a mobile marker that can read and process computerized construction plans and automatically mark those plans directly on the construction site.

Still another important object of the invention is to provide a method of plotting construction plans on a construction site without the necessities of on-site measuring or calculating necessitated by employing surveying or traditional measuring equipment.

Another important object of the invention is to provide a method and apparatus that may be used on every level of a building progressively as construction proceeds.

An important additional object of the invention is to provide an apparatus and method wherein an operator manually traverses a mobile applicator systematically over a construction site while progressively marking construction plans thereon.

Another important object of the invention is to provide an apparatus and method that can quickly, accurately, and distinctly mark designated components for different trades, such as plumbing layouts, electrical layouts, and other pertinent information by using different colors to indicate components for different trades.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a plotter for marking construction plans onto a construction site. The plotter includes a mobile applicator A for traversing the site and for marking the plans onto the construction site. A locator B is utilized for continuously providing data indicative of a current location of the applicator upon the construction site relative to the construction plans. A central processing unit C is provided for storing computerized construction plans, receiving the data indicative of the current location, and providing output signals responsive thereto. An actuator D operates the applicator responsive to the output signals from the central processing unit. Thus, the construction layout plans may be marked upon the construction site by a traversing applicator responsive to signals from the central processing unit.

Figure 1:
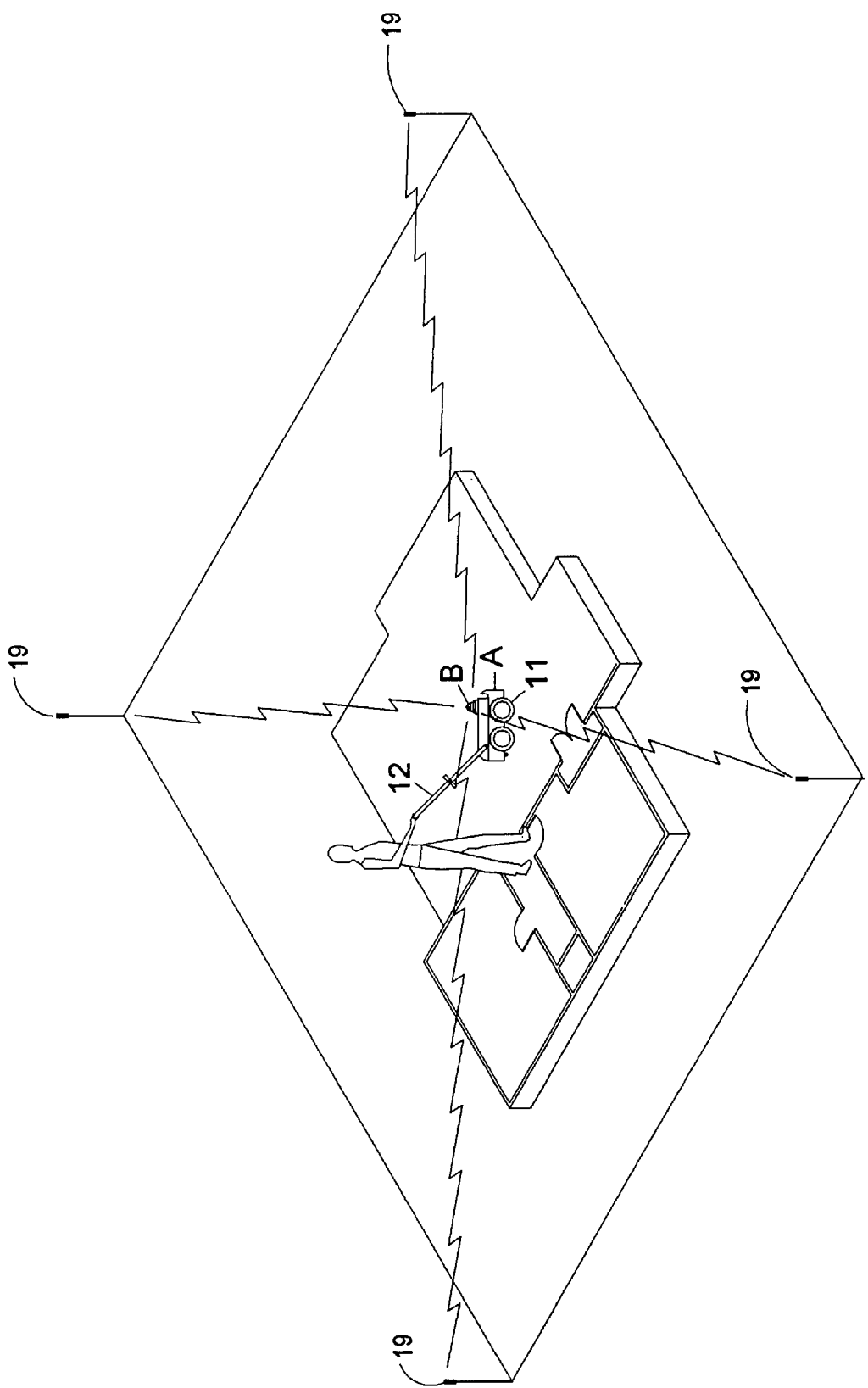
FIG. 1 is a perspective view illustrating a plotter utilizing a mobile applicator and reflection poles for locating the mobile applicator in accordance with the present invention.
Figure 2:
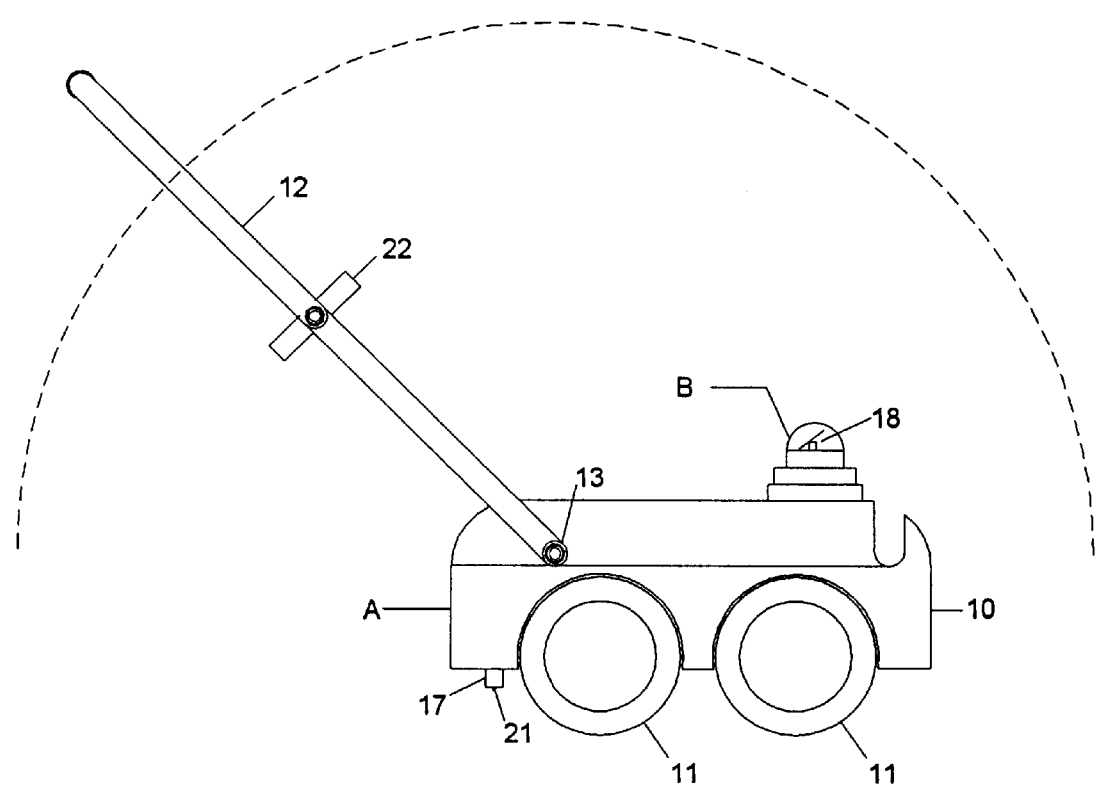
FIG. 2 is a side elevational view of the mobile applicator including a locator and a spray head carried by a support frame having wheels.
Figure 3:
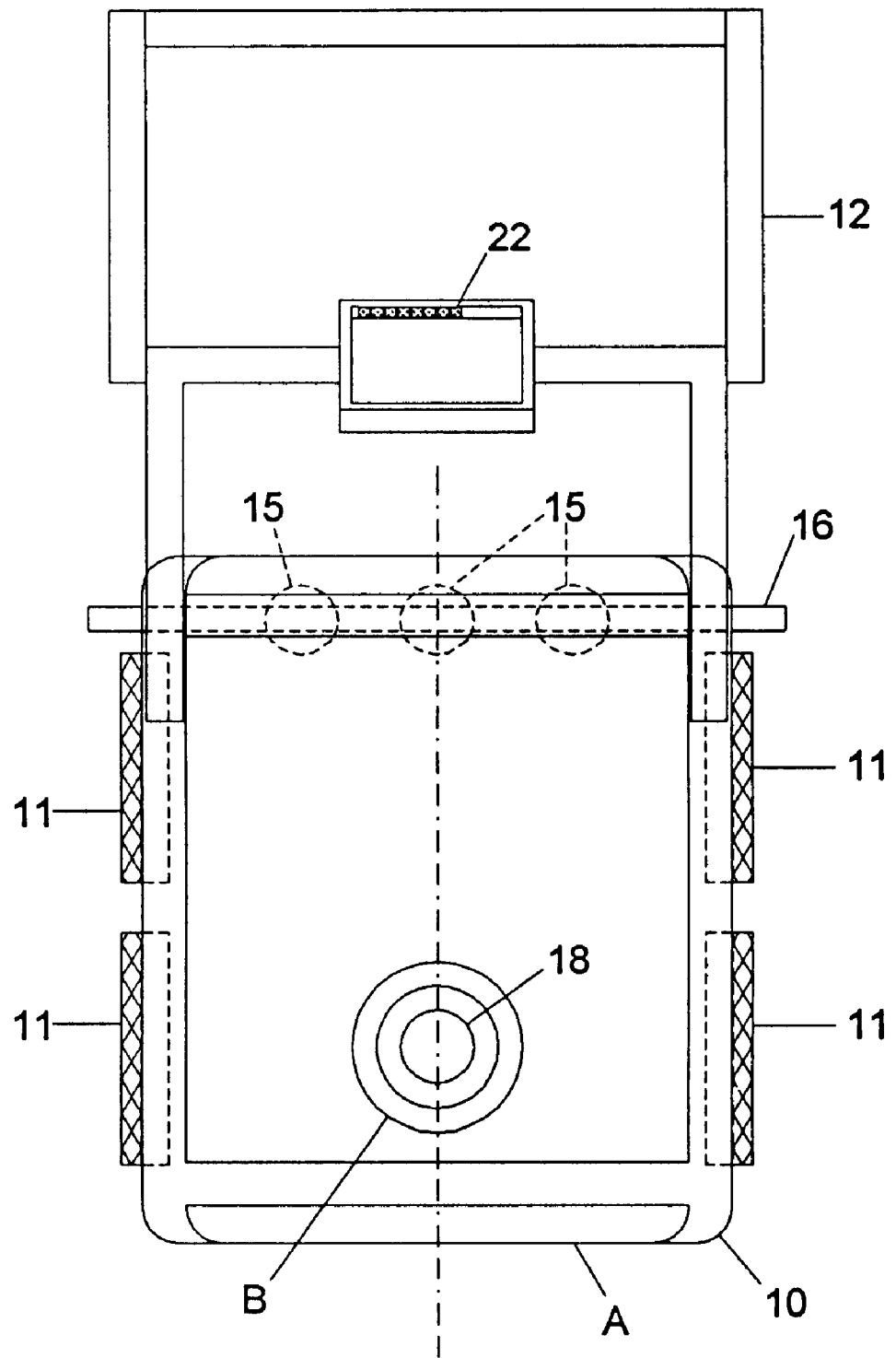
FIG. 3 is a top plan view further illustrating the mobile applicator.

FIGS. 1, 2 and 3 illustrate the mobile applicator A which has a support frame 10 carried by wheels 11, facilitating traversing of the mobile applicator across the construction site. A folding handle 12 is pivotally attached to the support frame at 13 so that the mobile applicator may be manually manipulated from either a front side or a back side. The handle may be folded into a downward position to maintain a low profile when the applicator is not in use. A suspension system (not shown) may be utilized with the wheels, allowing each wheel to independently move in a vertical direction to accommodate for uneven ground on the construction site.

In an alternative embodiment, a pair of tracks (not shown) may be used instead of wheels to facilitate movement of the applicator. Each track is engaged about a plurality of rotatable cylinders, much like the tracks used to propel a bulldozer.

Figure 4:
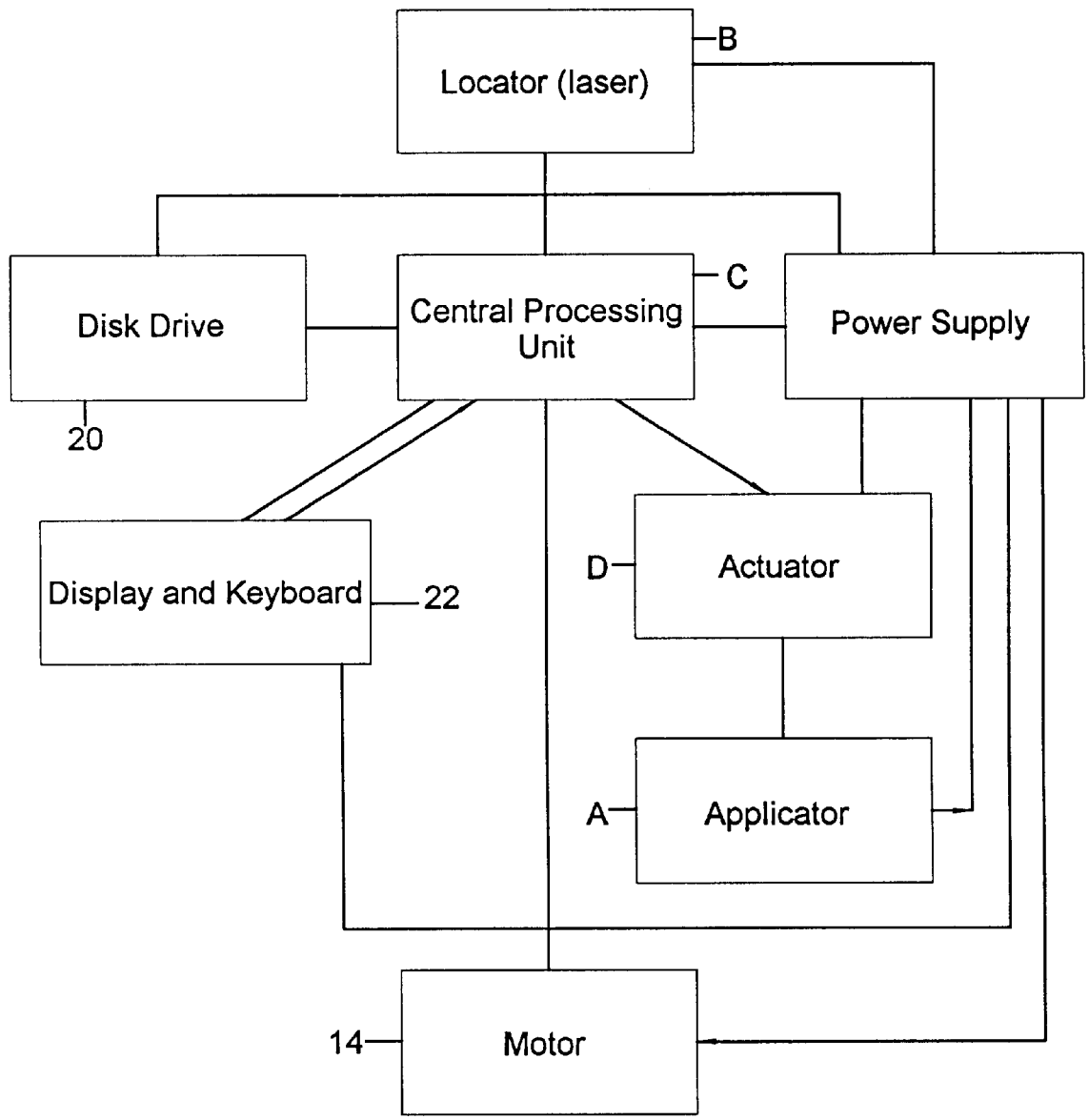
FIG. 4 is a schematic block diagram illustrating the central processing unit and related components carried by the mobile applicator.

Referring to FIG. 4, a motor 14, preferably a 12 volt Direct Current high torque motor, may be employed to drive at least one wheel so that the mobile applicator is self propelled, thus requiring less physical exertion by the operator, who only needs to guide the applicator during traversing. Suitable control circuitry (not shown) may be provided for the motor, allowing the operator to control the speed and engagement of the motor.

The mobile applicator A further includes a source of marking material such as landscape spray paint cans 15 with the nozzles removed and connected to a paint manifold 16 (FIG. 3), which selectively distributes paint to a plurality of spray heads 17. Alternatively, a paint reservoir may be used instead of landscape spray paint cans. Although a paint application system has been described, it is to be understood that any suitable marking system or means may be utilized.

The locator B is illustrated as including a laser transceiver 18 carried on the mobile applicator A and a plurality of reflection poles 19 serving as reference points for determining the current location of the applicator in relation to the plans and to the site. As shown in FIG. 1, the reflection poles are positioned at strategic locations on the construction site such as at the four outermost corners. The laser transceiver transmits laser beam signals, and the reference poles, such as round aluminum poles or surveying poles, reflect the laser beam signals for reception by the transceiver. The laser beam signals are used to locate the coordinates of the laser transceiver by determining the distance between the laser transceiver and each respective pole. The location of the applicator is also determined, because the locator and the applicator are positioned in close proximity to each other. The current location of the applicator is thus determined using the triangulation principal. The locator B continuously provides data to the central processing unit C indicative of the current location of the applicator relative to the construction plans. After a floor is in place for the first level, the poles may be relocated to four corners of the building, if desired. Although the system is shown using four reflection poles, more poles may be employed to increase the degree of accuracy in determining exact locations.

Alternatively, a Global Positioning System (GPS) may be used to determine the current location of the applicator. The GPS system is described in U.S. Pat. No. 5,365,447. Other types of current location systems may be utilized, such as those based on the transmission or beams of ultrasonic, infrared, radio, or microwave frequencies.

A computer disk drive 20 may be used for receiving either a floppy disk or a CD-ROM disk encoded with computer readable construction layout plans. A computer disk containing the construction plans in standard Computer Automated Drawing (CAD) format may be loaded into the disk drive, which is connected to the central processing unit C. The disk drive loads the construction plan data from the disk into the central processing unit in computerized form.

The central processing unit C continuously receives the data indicative of the current location of the applicator, coordinates this data with the computerized construction plans, and supplies output signals. As the mobile applicator traverses areas to be marked, the central processing unit sends output signals to the actuator D to selectively operate the applicator.

The actuator D includes individually activated solenoid actuation switches 21 for controlling the application of paint to the construction site. Each spray head 17 contains an actuation switch 21, so that precise marking of the layout plans may be facilitated. Responsive to the output signals from the central processing unit C, the actuator D causes the applicator A to selectively mark the construction site corresponding with the construction plans. This phase of the invention operates like an ink jet printer in general use.

In marking the construction plans on the site, an operator traverses the site with the mobile applicator in a path calculated to cover the entire area of the site, similarly to the path one might choose to mow grass. As the applicator passes over areas to be marked, the central processing unit determines where to mark the site by comparing the data indicative of the current location of the applicator with the construction plan data. The central processing unit then sends an output signal to the actuator, which selectively activates the individual spray heads. Thus, the construction layout plans are progressively marked on the construction site as the operator systematically traverses the mobile applicator over the entire area of the site. This process may be repeated on each level of a building, so that the construction plans are marked on each level of a building upon construction of each successive level.

A liquid crystal display (LCD) information and status screen 22 (FIGS. 2–4) is provided to indicate different types of information processed by the central processing unit. For example, the screen may display current location information, a representation of the construction plans, electrical plans, plumbing plans, battery power level, paint levels in the paint reservoir, or any other processed information. A full industry standard keyboard may be provided to input information or requests into the central processing unit. By inputting various commands into the central processing unit through the keyboard, an operator may cause the screen to display the status of any selected system. An audible signal may also be provided from a suitable source (not shown) to alert the operator of any systems that need immediate attention, such as a low battery charge or low paint levels in the paint reservoir.

Although the applicator will apply marks using only one color at a time, multiple paint colors may be used on different passes or runs over the site to indicate separate construction plans for different trades. For example, an operator may use white paint on a first pass over the site to indicate walls, doors and windows. On the second pass, the operator may use black paint to indicate electrical fixtures and wires. Another color may be used to lay out the plumbing system. The ability to plot and designate components for all trades greatly assists coordination of the project.

It has been found that this mobile applicator and method may be used by builders to accurately and quickly lay out plans for buildings, foundry or factory equipment, utility lines, or any other site data directly onto the ground or floor. The apparatus and method may also be used to lay out indoor or outdoor athletic courts and fields, parking lots, grading plans, landscape plans, and golf courses. Suitable sensors (not shown) may be provided to cause the mobile applicator to avoid running into obstructions such as plumbing which has been stubbed out, and to direct the mobile applicator around such objects. One or more wheels or tracks of the mobile applicator may be driven by the motor.

While a preferred embodiment of the invention has been described using specific terms, such description is for illustrative purposes only, and it is to be understood that changes and variations may be made without departing from the spirit or scope of the following claims.

What is claimed is:

1. A plotter for laying out construction ground and floor plans on a construction site comprising:

a platform carried on wheels for traversing a construction site;

an applicator on said platform for marking said construction site according to said construction plans;

a locator for continuously providing data indicative of a current location of said applicator upon said construction site relative to said construction plans;

a central processing unit for storing computerized construction plan data, receiving said data indicative of current location of said applicator, and providing output signals responsive thereto at predetermined locations;

said locator including a laser signal transceiver carried by said applicator;

a plurality of spaced reflectors serving as reference points on the construction site to reflect said laser signals;

a manually operated handle for guiding the the platform and wheels on a selected path traversing the construction site responsive to manual manipulation of the handle during marking; and a hand gripping means on said handle for moving the applicator responsive to manual force during marking; and an actuator for operating said platform responsive to said output signals from central processing unit;

whereby said computerized construction plans may be marked upon a construction site by a mobile applicator responsive to output signals from a central processing unit.

2. A method of laying out construction plans onto a construction site comprising the steps of:

providing an applicator on a platform carried on wheels for traversing a construction site for marking said said construction site according to said construction plans;

guiding said applicator through manual manipulation of a handle on said platform during laying out of the site;

traversing said mobile applicator systematically over said construction site by manually moving said applicator in a pattern over the site;

continuously determining a current applicator location relative to said construction site;

comparing said current applicator location with said construction plans to determine where to apply marks; and progressively marking said construction site as said mobile applicator traverses over said construction site, so that said marks correspond with said construction plans;

whereby construction plans are accurately marked upon a construction site by systematically traversing a mobile applicator over the construction site.

3. The method set forth in claim 2 including the step of progressively traversing said applicator over each level of a building upon construction of each successive level.

4. The method set forth in claim 2 including the step of marking different colors on said construction site indicating separate construction plans for different trades.

5. A method of laying out construction plans onto a construction site comprising the steps of:

providing an applicator on a platform carried on wheels for traversing a construction site for marking said construction site according to said construction plans;

traversing said applicator systematically over said construction site by manually guiding said applicator;

guiding said applicator through manual manipulation of a handle on said platform during laying out of the site;

utilizing a locator for continuously providing data indicative of a current location of said applicator relative to said plans;

comparing said data indicative of a current location of said applicator with said plans to determine where to apply marks to said construction site as the applicator is manually guided over the site; and marking said construction site corresponding with said plans;

whereby construction plans are accurately marked on a construction site by systematically traversing a mobile applicator over the construction site.

* * * * *